United States Patent
Lee et al.

(10) Patent No.: US 10,958,820 B2
(45) Date of Patent: *Mar. 23, 2021

(54) INTELLIGENT INTERFACE FOR INTERCHANGEABLE SENSORS

(71) Applicant: Scenera, Inc., Palo Alto, CA (US)

(72) Inventors: David D. Lee, Palo Alto, CA (US); Andrew Augustine Wajs, Haarlem, CA (US); Seungoh Ryu, Newton, MA (US); Chien Lim, San Jose, CA (US)

(73) Assignee: Scenera, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,809

(22) Filed: Jul. 30, 2019

(65) Prior Publication Data
US 2019/0356841 A1  Nov. 21, 2019

Related U.S. Application Data

(63) Continuation of application No. 15/583,919, filed on May 1, 2017.
(Continued)

(51) Int. Cl.
*H04N 5/232* (2006.01)
*H04N 5/225* (2006.01)
(Continued)

(52) U.S. Cl.
CPC ....... *H04N 5/23209* (2013.01); *H04N 5/2252* (2013.01); *H04N 5/2253* (2013.01);
(Continued)

(58) Field of Classification Search
CPC ..... H05K 7/00–2099; H05K 5/00–069; H04N 5/2252; H04N 5/2355;
(Continued)

(56) References Cited

U.S. PATENT DOCUMENTS 6,031,573 A   2/2000  Maccormack et al.
6,628,339 B1  9/2003  Ferland et al.
(Continued)

FOREIGN PATENT DOCUMENTS

WO   WO 2016/044778 A1   3/2016

OTHER PUBLICATIONS

Application Programming Interface, Wikipedia.org, Last edited Oct. 20, 2017, May be retrieved at<URL:https://en.wikipedia.org/wiki/Application programmino interface>.
(Continued)

*Primary Examiner* — Xi Wang
(74) *Attorney, Agent, or Firm* — Fenwick & West LLP

(57) ABSTRACT

A sensor device has a sensor base with a sensor mount, for which different sensor assemblies are attachable to the sensor mount. The sensor base transmits different settings to the sensor assembly via the sensor mount interface. The transmission preferably is wireless, rather than using mechanical connectors. The sensor assembly stores the settings in control registers that determine the settings for the capture of sensor data. In one approach, the sensor base includes an application processor and software executing on the application processor determines the settings. The control registers for the sensor assembly are thus software programmable, allowing different settings to be applied to different samples of sensor data.

20 Claims, 14 Drawing Sheets

Related U.S. Application Data

(60) Provisional application No. 62/338,948, filed on May 19, 2016, provisional application No. 62/383,288, filed on Sep. 2, 2016.

(51) Int. Cl.

| | | |
|---|---|---|
| *H04N 5/235* | (2006.01) | |
| *H04N 5/33* | (2006.01) | |
| *H04N 5/247* | (2006.01) | |
| *H04N 5/77* | (2006.01) | |
| *H04N 13/254* | (2018.01) | |
| *H04N 13/271* | (2018.01) | |
| *H04N 13/239* | (2018.01) | |

(52) U.S. Cl.
CPC ....... *H04N 5/2355* (2013.01); *H04N 5/23206* (2013.01); *H04N 5/23216* (2013.01); *H04N 5/23245* (2013.01); *H04N 5/332* (2013.01); *H04N 13/239* (2018.05); *H04N 13/254* (2018.05); *H04N 13/271* (2018.05); *H04N 5/23219* (2013.01); *H04N 5/247* (2013.01); *H04N 5/77* (2013.01)

(58) Field of Classification Search
CPC .... H04N 5/355–3559; G02B 27/22–26; G03B 35/00–26; G06T 5/007–009; G06R 2207/20208
USPC .......................... 348/208.1, 220.2, 373–376; 396/324–332; 352/57–65; 361/600–837
See application file for complete search history.

(56) References Cited

U.S. PATENT DOCUMENTS

| | | |
|---|---|---|
| 8,560,785 B1 | 10/2013 | Malhotra et al. |
| 8,970,654 B1 | 3/2015 | Johnson et al. |
| 9,225,889 B1 | 12/2015 | Korkin |
| 2001/0043271 A1 | 11/2001 | Kawano |
| 2003/0227392 A1 | 12/2003 | Ebert et al. |
| 2004/0048507 A1 | 3/2004 | Hage |
| 2005/0132385 A1 | 6/2005 | Bourges-Seven ier |
| 2006/0055819 A1 | 3/2006 | Pokrovsky et al. |
| 2006/0187338 A1 | 8/2006 | May et al. |
| 2007/0195182 A1 | 8/2007 | Ito |
| 2008/0024614 A1 | 1/2008 | Li et al. |
| 2008/0030592 A1* | 2/2008 | Border ................. H04N 5/232 348/218.1 |
| 2008/0074540 A1 | 3/2008 | Liu |
| 2008/0211941 A1 | 9/2008 | Deever et al. |
| 2010/0079625 A1 | 4/2010 | Miwa |
| 2010/0250497 A1 | 9/2010 | Redlich et al. |
| 2010/0321528 A1 | 12/2010 | Yu et al. |
| 2011/0199497 A1 | 8/2011 | Motta |
| 2011/0211215 A1 | 9/2011 | Yamamoto |
| 2011/0234807 A1 | 9/2011 | Jones et al. |
| 2011/0242317 A1 | 10/2011 | Wengrovitz |
| 2012/0151432 A1* | 6/2012 | Long ................. G06F 8/30 717/100 |
| 2012/0162366 A1 | 6/2012 | Ninan et al. |
| 2012/0258658 A1 | 10/2012 | Matsuo |
| 2012/0275640 A1 | 11/2012 | Widzinski et al. |
| 2012/0294583 A1 | 11/2012 | Kosaka et al. |
| 2013/0057713 A1 | 3/2013 | Khawand |
| 2013/0176458 A1 | 7/2013 | Van Dalen et al. |
| 2013/0272627 A1 | 10/2013 | Chen et al. |
| 2013/0308036 A1 | 11/2013 | Peng |
| 2014/0022399 A1 | 1/2014 | Rashid |
| 2014/0139643 A1 | 5/2014 | Hogasten et al. |
| 2014/0306010 A1 | 10/2014 | Prokop |
| 2015/0146037 A1 | 5/2015 | Keelan |
| 2015/0227797 A1 | 8/2015 | Ko et al. |
| 2015/0244943 A1 | 8/2015 | Brown |
| 2015/0334285 A1 | 11/2015 | Zhang et al. |
| 2015/0350711 A1 | 12/2015 | Guzik |
| 2016/0006920 A1 | 1/2016 | Gomes Da Motta et al. |
| 2016/0044227 A1 | 2/2016 | Johnson et al. |
| 2016/0056964 A1 | 2/2016 | Andiappan et al. |
| 2016/0063036 A1 | 3/2016 | Kawai |
| 2016/0112630 A1 | 4/2016 | Kanumuri et al. |
| 2016/0134932 A1 | 5/2016 | Karp et al. |
| 2017/0093852 A1 | 3/2017 | Khosravi et al. |
| 2017/0180386 A1 | 6/2017 | Dewan et al. |
| 2017/0339328 A1* | 11/2017 | Lee ................. H04N 5/3209 348/211.1 |

OTHER PUBLICATIONS

Encryption, Wikipedia.org, Last edited Oct. 3, 2017, May be retrieved at<https://en.wikipedia.org/wiki/Encryption>.
PCT International Search Report and Written Opinion, PCT Application No. PCT/US17/32267, dated Jul. 31, 2017, 28 pages.
PCT International Search Report and Written Opinion, PCT Application No. PCT/US17/32268, dated Sep. 15, 2017, 22 pages.
PCT International Search Report and Written Opinion, PCT Application No. PCT/US17/32269, dated Sep. 14, 2017, 24 pages.
PCT International Search Report and Written Opinion, PCT Application No. PCT/US17/48383, dated Dec. 22, 2017, 18 pages.
PCT Invitation to Pay Additional Fees, PCT Application No. PCT/US17/32268, dated Jul. 18, 2017, 2 pages.
PCT Invitation to Pay Additional Fees, PCT Application No. PCT/US17/32269, dated Jul. 18, 2017, 2 pages.
PCT Invitation to Pay Additional Fees, PCT Application No. PCT/US17/48383, dated Oct. 18, 2017, 2 pages.
U.S. Appl. No. 15/469,380, filed Mar. 24, 2017, Inventors: David D. Lee et al.
U.S. Appl. No. 15/487,416, filed Apr. 13, 2017, Inventors: David D. Lee et al.
United States Office Action, U.S. Appl. No. 15/583,919, dated Aug. 9, 2018, 22 pages.
United States Office Action, U.S. Appl. No. 15/583,919, dated Feb. 8, 2018, 26 pages.
United States Office Action, U.S. Appl. No. 15/583,919, dated Jul. 24, 2017, 16 pages.

* cited by examiner

Application: Home Surveillance

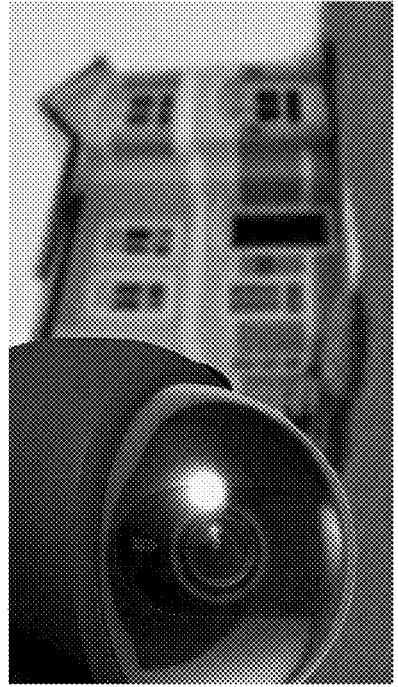

Scene Mode: #1

Camera Capabilities:

[Exposure] · [Gain] · [RGB] · [IR] · [Audio]

Iris/Aperture · Pan/Tilt/Zoom · Flash · Temperature

Depth · [Optical Flow] · [Face Recognition] · [Object Recognition]

Emotion Recognition · Sound Recognition · [P2P] · SNS

SceneData
Audio:

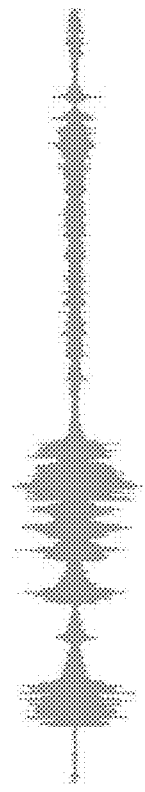

Video Frames:

Frame 1 (RGB)   Frame 2 (IR)

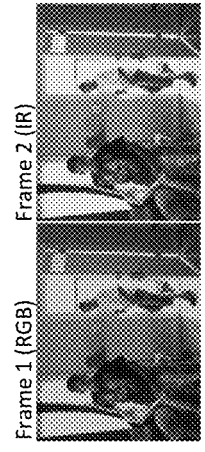

Tagged Metadata:
Optical Flow: Motion detected
Object Recognition: 2 Human detected
Face Recognition: Unknown person

Triggered Action:
Sound the Alarm and notify home owner

FIG. 3

| CaptureMode | CapturedData | ProcessedData |
|---|---|---|
| High Dynamic Range (HDR) | Multiple RGB frames at different exposures | Improved Image |
| Biometric | RGB + IR frames | Face/Iris detection |
| Kinetic | 2+ Continuous Frames | Optical Flow |
| Multi-focal | RGB(near focus) + RGB(far focus) | Object at different distance |
| Stereo/Array | Multi-camera capture | Synchronized multi-camera capture |
| Crop | RGB (low res of full image) + RGB (high res of cropped image) | Eye/Object detection |

FIG. 4A

| SceneMode | CaptureModes | | | | | |
|---|---|---|---|---|---|---|
| | HDR | Biometric | Kinetic | Multi-focal | Stereo/Array | Crop |
| Security | ✓ | ✓ | | | ✓ | ✓ |
| Robotic | | ✓ | | ✓ | | |
| Creative | | | ✓ | ✓ | | |
| Appliance/IoT | | ✓ | ✓ | | | |
| Health/Lifestyle | ✓ | ✓ | | | ✓ | |
| Leisure | | ✓ | ✓ | | | |

FIG. 4B

| ControlClass | Camera Parameter | | | | | | | | |
|---|---|---|---|---|---|---|---|---|---|
| | Exposure | Gain | ICR Switch | IR/Visible Flash | Aperture | Zoom | Pan/Tilt | Focus | Multi Sensor | Window Size |
| HDR | ✓ | ✓ | ✓ | ✓ | ✓ | | | | | |
| Biometric | ✓ | ✓ | | | ✓ | ✓ | ✓ | | | ✓ |
| Kinetic | ✓ | ✓ | | | ✓ | | ✓ | | | |
| Multi-focal | ✓ | ✓ | | ✓ | ✓ | | | ✓ | | |
| Stereo/Array | ✓ | ✓ | | | ✓ | | | | ✓ | |
| Crop | ✓ | ✓ | | | ✓ | | | | | ✓ |

FIG. 8

INTELLIGENT INTERFACE FOR INTERCHANGEABLE SENSORS

CROSS-REFERENCE TO RELATED APPLICATION(S)

This application is a continuation of U.S. patent application Ser. No. 15/583,919, "Intelligent Interface for Interchangeable Sensors," filed May 1, 2017; which claims priority under 35 U.S.C. § 119(e) to U.S. Provisional Patent Appl. Ser. No. 62/338,948 "Network of Intelligent Surveillance Sensors" filed May 19, 2016, and to 62/383,288 "Sensor Interface for Use with Network of Intelligent Surveillance Sensors" filed Sep. 2, 2016. The subject matter of all of the foregoing is incorporated herein by reference in their entirety.

BACKGROUND

1. Field of the Invention

This disclosure relates generally to obtaining, analyzing and presenting information from sensor devices, including for example cameras.

2. Description of Related Art

Millions of cameras and other sensor devices are deployed today. There generally is no mechanism to enable computing to easily interact with these sensor networks, particularly as they change over time. The processing of information is highly application specific. Applications such as advanced driver assisted systems and security based on facial recognition require custom built software which reads in raw images from cameras and then processes the raw images in a specific way for the target application. The application developers typically must create application-specific software to process the raw video frames to extract the desired information. The application-specific software typically is a full stack beginning with low-level interfaces to specific sensor devices and progressing through different levels of analysis to the final desired results.

As a result, the development of applications that make use of networks of sensors is both slow and limited. For example, surveillance cameras installed in an environment typically are used only for security purposes and in a very limited way. Furthermore, as technology progresses, more and better types of sensor devices become available. However, upgrading or replacing the original sensor devices may require reprogramming of the lower layers of the technology stack, thus slowing or preventing the adoption of new or improved sensor technologies.

Thus, there is a need for more flexibility and ease in accommodating changes to sensor networks and the underlying sensor devices, including cameras.

SUMMARY

The present disclosure overcomes the limitations of the prior art by providing a sensor device that has a sensor base with a sensor mount, for which different sensor assemblies are attachable to the sensor mount. The sensor base transmits different settings to the sensor assembly via the sensor mount interface. The transmission preferably is wireless, rather than using mechanical connectors. The sensor assembly stores the settings in control registers that determine the settings for the capture of sensor data. In one approach, the sensor base includes an application processor and software executing on the application processor determines the settings. The control registers for the sensor assembly are thus software programmable, allowing different settings to be applied to different samples of sensor data.

In some embodiments, the sensor assembly includes an image capture sensor (a camera) that captures a video sequence of images, and the settings transmitted to the sensor assembly include different settings for the capture of different frames within the video sequence. For example, the interface may allow the settings to be changed on a frame-by-frame basis, so that every frame may be captured using a different setting than the previous frame. As another example, the interface may also support the simultaneous capture of two or more different video sequences using different settings, for example if the sensor assembly includes multiple cameras. The settings may also specify interleaving of the captured video sequences.

Preferably, the settings transmitted over the interface abstract away from the specific hardware implementation of the sensor assembly. In one approach, the settings include parameters for the sensors and the parameters are grouped into classes that will be referred to as ControlClasses. The ControlClasses are then transmitted over the interface, rather than separately transmitting the individual parameters.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples shown in the accompanying drawings, in which:

FIG. 3 illustrates an example SceneMode.

FIG. 4A is a table defining different CaptureModes.

FIG. 4B is a table defining different SceneModes in terms of CaptureModes.

FIG. 8 is a table defining ControlClasses in terms of sensor parameters.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1A:
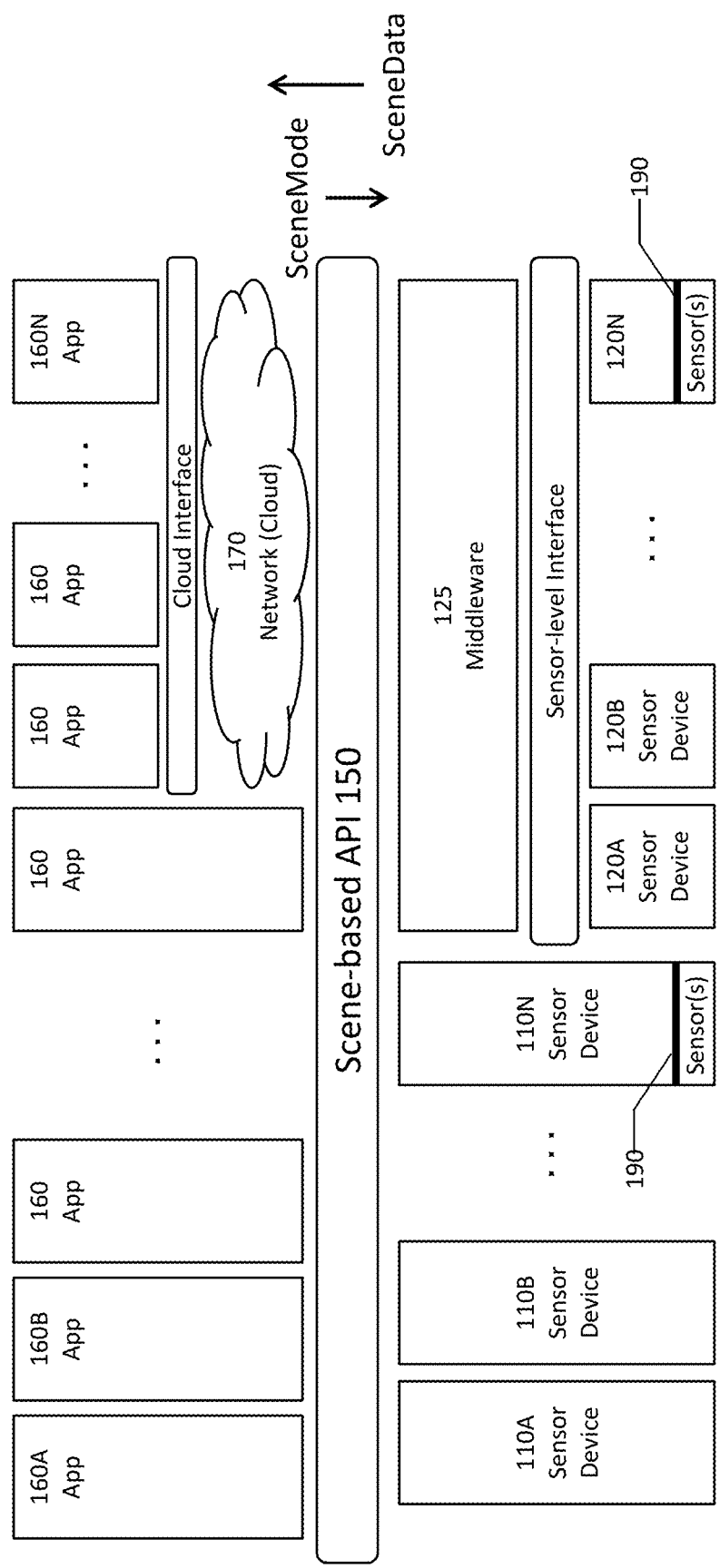
FIG. 1A is a block diagram of a technology stack using Scenes.

FIG. 1A is a block diagram of a technology stack using Scenes. In this example, there are a number of sensor devices 110A-N, 120A-N that are capable of capturing sensor data. Examples of sensor devices include cameras and other image capture devices, including monochrome, single-color, multi-color, RGB, other visible, IR, 4-color (e.g., RGB+IR), stereo, multi-view, strobed, and high-speed; audio sensor devices, including microphones and vibration sensors; depth sensor devices, including LIDAR, depth by deblur, time of flight and structured light devices; and temperature/thermal sensor devices. Other sensor channels could also be used, for example motion sensors and different types of material detectors (e.g., metal detector, smoke detector, carbon monoxide detector). There are a number of applications 160A-N that consume the data captured by the sensor devices 110, 120.

The technology stack from the sensor devices 110, 120 to the applications 160 organizes the captured sensor data into Scenes, and Scenes of interest are marked by SceneMarks. In this example, the generation of Scenes and SceneMarks is facilitated by a Scene-based API 150, although this is not required. Some of the applications 160 access the sensor data and sensor devices directly through the API 150, and other applications 160 make access through networks which will generically be referred to as the cloud 170. The sensor devices 110, 120 and their corresponding data can also make direct access to the API 150, or can make access through the cloud (not shown in FIG. 1A).

In FIG. 1A, some of the sensor devices 110 are directly compatible with the Scene-based API 150. For other sensor devices 120, for example legacy devices already in the field, compatibility can be achieved via middleware 125. For convenience, the technology stack from the API 150 to the sensor devices 110, 120 will be referred to as the sensor-side stack, and the technology stack from the API 150 to the applications 160 will be referred to as the application-side stack.

The Scene-based API 150 and SceneMarks preferably are implemented as standards. They abstract away from the specifics of the sensor hardware and also abstract away from implementation specifics for processing and analysis of captured sensor data. In this way, application developers can specify their data requirements at a higher level and need not be concerned with specifying the sensor-level settings (such as F/#, shutter speed, etc.) that are typically required today. In addition, device and module suppliers can then meet those requirements in a manner that is optimal for their products. Furthermore, older sensor devices and modules can be replaced with more capable newer products, so long as compatibility with the Scene-based API 150 is maintained.

Some of the sensor devices 110, 120 also use an interchangeable sensor mount (ISM) 190. The ISM allows different sensor assemblies to be installed on the sensor device. The ISM preferably is implemented as a standard and it preferably also abstracts away from the specific hardware implementation of the sensor assembly.

Figure 1B:
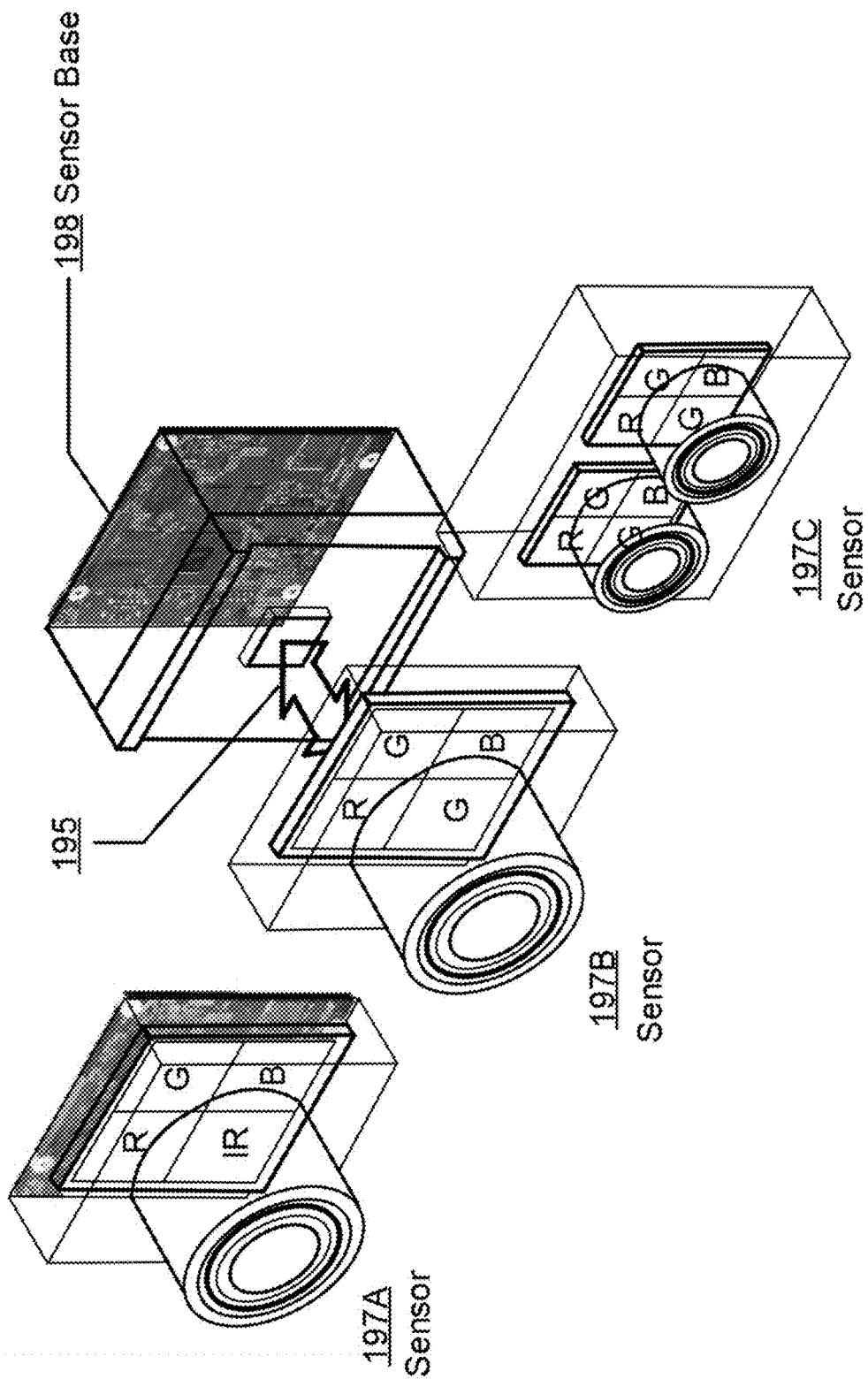
FIG. 1B is a diagram illustrating a mount to allow different camera sensor assemblies to interface to a common sensor base.

FIG. 1B is a diagram illustrating a sensor device with an ISM 195 to allow different camera sensor assemblies 197A-C to work with a common sensor base 198. In this example, camera assembly 197A is a 4-color image capture sensor (RGB+infrared) with integrated lens and ISP (image signal processor) and uses USB communication. The second camera assembly 197B is a 3-color (RGB) Bayer image sensor with integrated lens and uses MIPI for communication. The third camera assembly 197C is a stereo sensor that includes two image capture sensor arrays and corresponding lenses. It also uses MIPI for communication. In this example, the ISM 195 is an interchangeable connectorless camera mount. It is interchangeable in the sense that different camera assemblies 197A-C may be attached/detached to the mount 195 and the mount 195 also provides an interface to allow the different assembles 197 to interoperate with the sensor base 198. In this example, the interface is connectorless (e.g., near-field wireless), although that is not required. Conventional mechanical connectors could also be used. The sensor base 198 has additional functionality, for example integrated circuits for processing and data storage, WiFi, Bluetooth, LTE, Ethernet, USB, Audio I/O, HDMI, SD card and/or alarm I/O. Mount 195 is one example of an ISM. Other examples will be described in more detail below after some additional description of Scenes.

FIG. 1A shows multiple applications 160 and multiple sensor devices 110, 120. However, any combinations of applications and sensor devices are possible. Data requests from different applications may also be multiplexed at the sensor devices. For convenience, the sensor devices 110, 120 that are interacting with an application will be referred to as a sensor group. Note that a sensor group may include just one device.

The system in FIG. 1A is Scene-based, which takes into consideration the context for which sensor data is gathered and processed. Using video cameras as an example, a conventional approach may allow/require the user to specify a handful of sensor-level settings for video capture: f-number, shutter speed, frames per second, resolution, etc. In contrast, human understanding of the real world generally occurs at a higher level. For example, consider a security-surveillance application. A "Scene" in that context may naturally initiate by a distinct onset of motion in an otherwise static room, proceed as human activity occurs, and terminate when everyone leaves and the room reverts to the static situation. The relevant sensor data may come from multiple different sensor channels and the desired data may change as the Scene progresses. In addition, the information desired for human understanding typically is higher level than the raw image frames captured by a camera. For example, the human end user may ultimately be interested in data such as "How many people are there?", "Who are they?", "What are they doing?", "Should the authorities be alerted?" In a conventional system, the application developer would have to first determine and then code this intelligence, including providing individual sensor-level settings for each relevant sensor device.

In the Scene-based approach of FIG. 1A, some or all of this is moved from the application-side of the API 150 to the sensor-side of the API, for example into the sensor devices/modules 110,120, into the middleware 125, or into other components (e.g., cloud-based services) that are involved in generating SceneData to be returned across the API. As one example, the application developer may simply specify different SceneModes, which define what high level data should be returned to the application. The sensor-side technology stack takes care of the details re: what types of processing and analysis of the data should be performed, and how and where to perform those. In a general sense, a SceneMode defines a workflow which specifies the capture settings for one or more sensor devices (for example, using CaptureModes as described below), as well as other necessary sensor behaviors.

The data returned across the API 150 will be referred to as SceneData, and it can include both the data captured by the sensor devices, as well as additional derived data. It typically will include more than one type of sensor data collected by the sensor group (e.g., different types of images and/or non-image sensor data) and typically will also include some significant processing or analysis of that data.

This data is organized in a manner that facilitates higher level understanding of the underlying Scenes. For example, many different types of data may be grouped together into timestamped packages, which will be referred to as SceneShots. Because data is organized into Scenes rather than provided as raw data, Scenes of interest or points of interest within a Scene may be marked and annotated by markers which will be referred to as SceneMarks.

Figure 2:
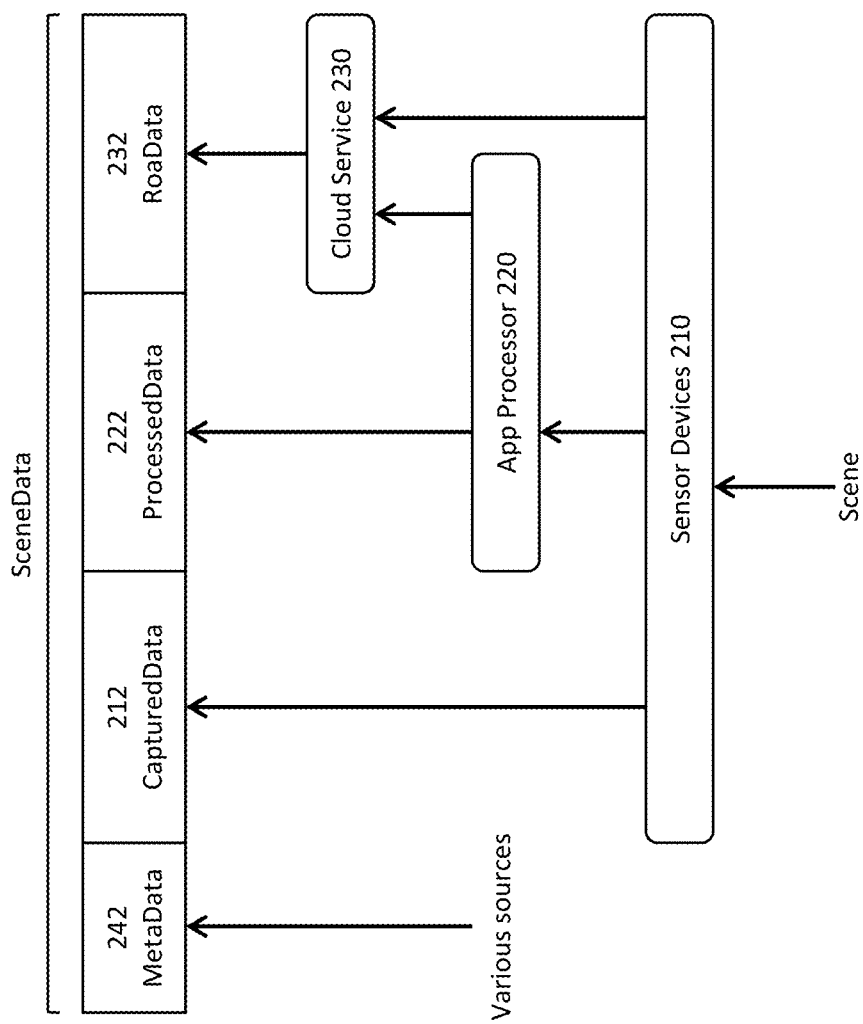
FIG. 2 is a diagram illustrating different types of SceneData.

FIG. 2 is a diagram illustrating different types of SceneData. The base data captured by sensor channels 210 will be referred to as CapturedData 212. Within the video context, examples of CapturedData include monochrome, color, infrared, and images captured at different resolutions and frame rates. Non-image types of CapturedData include audio, temperature, ambient lighting or luminosity and other types of data about the ambient environment.

CapturedData can also be processed, preferably on-board the sensor device, to produce ProcessedData 222. In FIG. 2, the processing is performed by an application processor 220 that is embedded in the sensor device. Examples of ProcessedData 222 include filtered and enhanced images, and the combination of different images or with other data from different sensor channels. Noise-reduced images and resampled images are some examples. As additional examples, lower resolution color images might be combined with higher resolution black and white images to produce a higher resolution color image. Or imagery may be registered to depth information to produce an image with depth or even a three-dimensional model. Images may also be processed to extract geometric object representations. Wider field of view images may be processed to identify objects of interest (e.g., face, eyes, weapons) and then cropped to provide local images around those objects. Optical flow may be obtained by processing consecutive frames for motion vectors and frame-to-frame tracking of objects. Multiple audio channels from directed microphones can be processed to provide localized or 3D mapped audio. ProcessedData preferably can be data processed in real time while images are being captured. Such processing may happen pixel by pixel, or line by line, so that processing can begin before the entire image is available.

SceneData can also include different types of MetaData 242 from various sources.

Any of this data can be subject to further analysis, producing data that will be referred to generally as ResultsOfAnalysisData, or RoaData 232 for short. In the example of FIG. 2, the analysis is artificial intelligence/machine learning performed by cloud resources 230. This analysis may also be based on large amounts of other data. Compared to RoaData, ProcessedData typically is more independent of the SceneMode, producing intermediate building blocks that may be used for many different types of later analysis. RoaData tends to be more specific to the end function desired. As a result, the analysis for RoaData can require more computing resources. Thus, it is more likely to occur off-device and not in real-time during data capture. RoaData may be returned asynchronously back to the scene analysis for further use.

The SceneMode provides some context for the Scene at hand, and the SceneData returned preferably is a set of data that is more relevant (and less bulky) than the raw sensor data captured by the sensor channels. In one approach, Scenes are built up from more atomic Events. In one model, individual sensor samples are aggregated into SceneShots, Events are derived from the SceneShots, and then Scenes are built up from the Events. SceneMarks are used to mark Scenes of interest or points of interest within a Scene. Note that Scenes can also be hierarchical.

Depending on the application, the Scenes of interest will vary and the data capture and processing will also vary. FIG. 3 illustrates an example SceneMode #1, which in this example is used by a home surveillance application. In the lefthand side of FIG. 3, each of the icons on the dial represents a different SceneMode. In FIG. 3, the dial is set to the house icon which indicates SceneMode #1. The SceneData specified by this SceneMode is shown in the righthand side of FIG. 3. The SceneData includes audio, RGB frames, IR frames. It also includes metadata for motion detection (from optical flow capability), human detection (from object recognition capability) and whether the humans are known or strangers (from face recognition capability). To provide the required SceneData, the sensor-side technology stack typically will use the image and processing capabilities which are boxed on the lefthand side of FIG. 3: exposure, gain, RGB, IR, audio, optical flow, face recognition, object recognition and P2P, and sets parameters for these functions according to the mode. Upon detection of unrecognized humans, the application sounds an alarm and notifies the owner. The use of SceneData beyond just standard RGB video frames helps to achieve automatic quick detection of intruders, triggering appropriate actions.

In one approach, SceneModes are based on more basic building blocks called CaptureModes. FIG. 4A is a table defining different CaptureModes. The CaptureModes correspond to different types of sensor data collection and production that may be used in different applications. The first row is the High Dynamic Range (HDR) CaptureMode. In this mode, three frames are captured for every SceneShot: one at high exposure, one at medium exposure and one at low exposure. These are combined to produce one frame with higher dynamic range.

For the remainder of the table in FIG. 4A, the Biometric CaptureMode uses RGB and IR images, and processes these to produce face/iris detection. The Kinetic CaptureMode captures consecutive image frames and compares them to produce optical flow data. The Multi-focal CaptureMode captures images using different focal lengths. From this, depth estimates can be produced. For the Stereo/Array CaptureMode, images of a Scene are captured by multiple cameras and these images are synchronized and registered to each other. In the Crop CaptureMode, a low resolution color image with large field of view is captured. Rapid digital zoom magnifies a region of interest. This is followed by face detection and recognition to identify the subject of interest. Then the locations of the eyes are determined. Cameras are directed to the eye locations, using optical zoom and digital cropping.

FIG. 4B is a table that shows which SceneModes might use which CaptureModes. The SceneModes in this example are Security, Robotic, Creative, Appliance/IoT, Health/Lifestyle and Leisure. The Security SceneMode uses the HDR, Biometric, Stereo/Array and Crop CaptureModes to produce the SceneData required by that mode. The remaining rows provide additional examples of SceneModes defined in terms of CaptureModes. The definition of SceneModes can also be augmented by additional information. For example, the Security SceneMode could be defined as the four checked CaptureModes, plus additional processed or analyzed data not included in these four CaptureModes.

Additional examples and details of Scenes, SceneData, SceneModes, CaptureModes and SceneMarks are described in U.S. patent application Ser. No. 15/469,380 "Scene-based Sensor Networks" and Ser. No. 15/487,416 "Scene Marking", which are incorporated by reference herein.

Figure 5A:
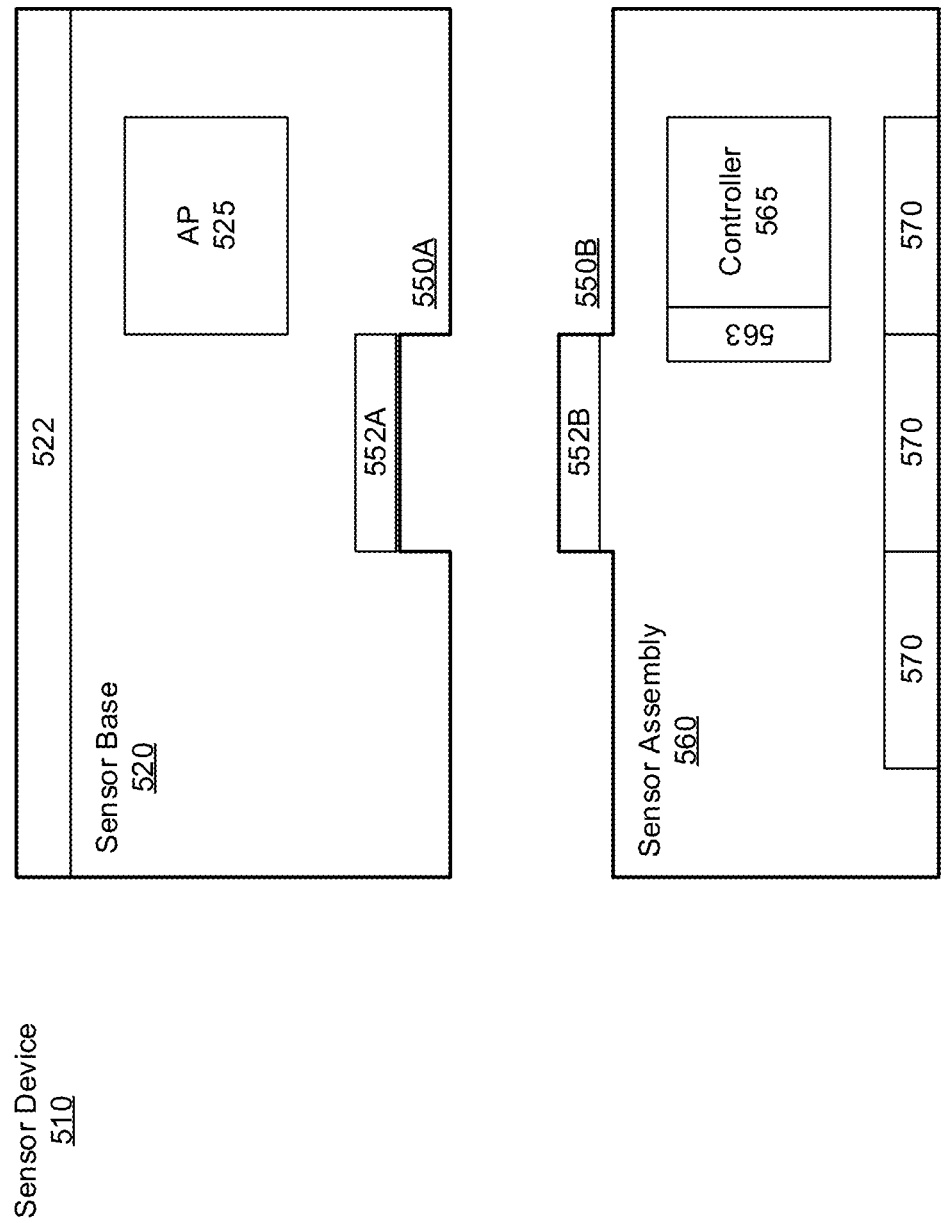
FIG. 5A is a block diagram of a sensor device using an interchangeable sensor mount.

FIG. 5A is a block diagram of a sensor device 510 with an ISM 550. "Sensor devices" are not limited to devices which primary function is the capture of sensor data. Any device that includes sensors can be a sensor device, including for example mobile devices, mobile phones, laptops, desktops, tablets, and surveillance devices. The sensor device 510 includes a base 520 and an interchangeable sensor assembly 560. The sensor base 520 includes an interface 522 to higher layers of the technology stack and an application processor 525. The mount 550A includes an interface 552A to the sensor assembly 560. The sensor assembly 560 includes the counterpart mount 550B and interface 552B. The assembly 560 also includes one or more sensor(s) 570 and a controller 565. Software-programmable registers 563 are used to determine the settings for capture of sensor data by the sensors 570.

The sensor device 510 operates as follows. The sensor device 510 receives requests from higher layers in the stack for the capture of sensor data. These requests are transmitted to the sensor device 510 via interface 522. The application processor 525 processes these requests and converts them to settings for the sensor assembly 560. The settings are communicated to the sensor assembly 560 via the interface 552. In the sensor assembly 560, the settings are stored in the control registers 563, and the controller 565 controls the assembly 560 to capture sensor data accordingly. Because the control registers 563 are software programmable, the application processor 525 can change the capture settings by sending new settings to the sensor assembly 560. As a result, different samples of sensor data may be captured using different settings.

Figure 5B:
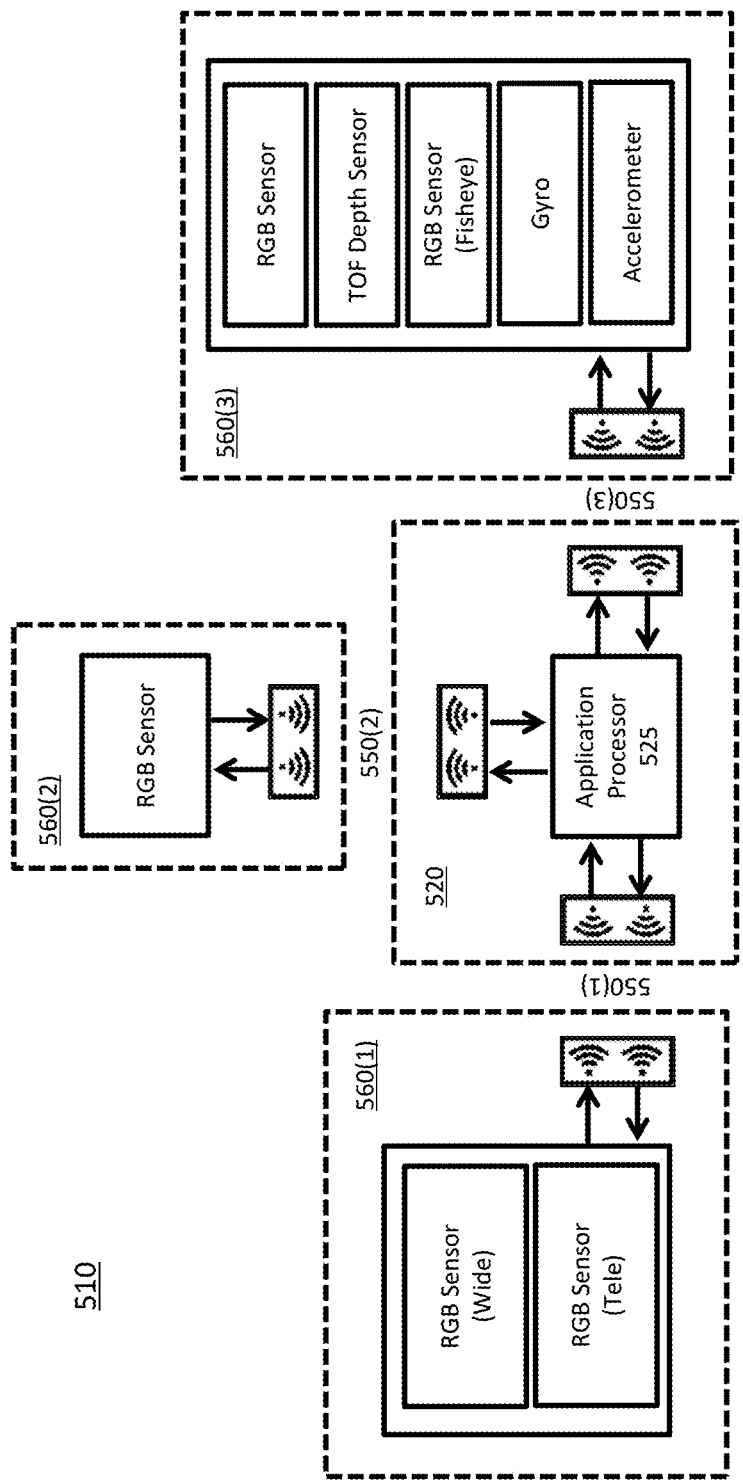
FIG. 5B is a block diagram of a sensor device with multiple interchangeable sensor mounts.

FIG. 5B shows an example in which the sensor device 510 includes multiple sensor assemblies. The sensor base 520 includes an application processor 525 and three separate ISMs 550(1)-550(3). These provide interfaces to three different sensor assemblies 560(1)-560(3). Sensor assembly 560(2) is an ordinary RGB camera. Sensor assembly 560(1) provides two additional color cameras with wide angle and telephoto capabilities. Sensor assembly 560(3) includes a second RGB camera (which could be used with the other RGB camera to provide stereo vision) and a camera with a fisheye lens. It also includes non-imaging sensors: a time of flight depth sensor, a gyroscope and an accelerometer. Sensor assemblies may also be stacked or daisy chained, with the sensor assemblies connected in a chain back to the sensor base, rather than having each sensor assembly connect directly to the sensor base.

FIGS. 6-7 provide some example timelines of image capture using an ISM interface, with reference to the sensor device of FIG. 5. In the following examples, the sensor assembly 560 captures a video sequence of images. The different rows show timing diagrams for different signals. The top row shows the data received by the sensor assembly 560 via the ISM interface 552. The middle row shows setting of the relevant control registers 563. The bottom row shows frame-by-frame image capture. The dashed line indicates the beginning of a frame. In this particular example, frames are separated by blanking intervals. Different frames within the sequence are captured using different settings.

Figure 6A:
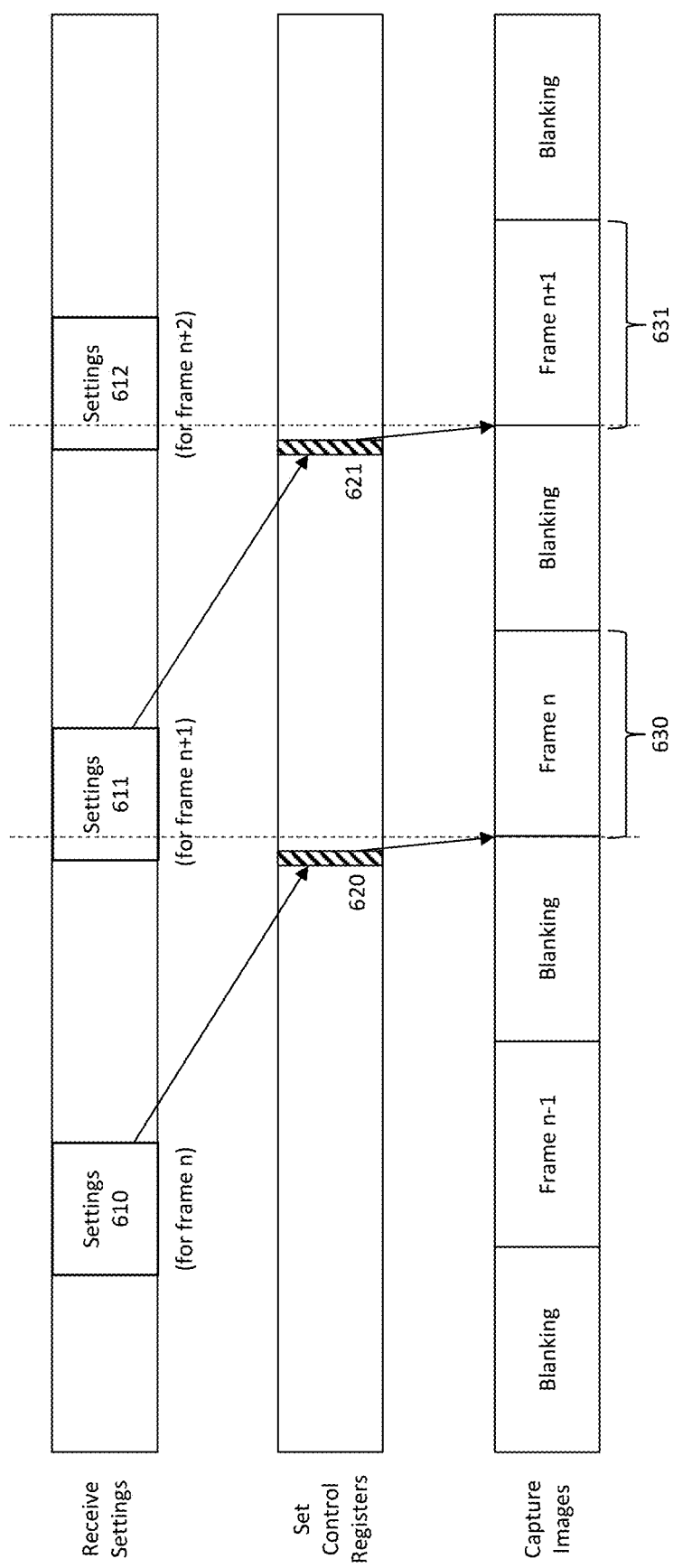
FIGS. 6A and 6B are example timelines illustrating control of the capture of a video sequence.

FIG. 6A shows an example using frame-by-frame control. Settings 610 are the settings for the capture of frame n, settings 611 are for the capture of frame n+1, and so on. The settings 610 are transmitted to the sensor assembly with sufficient time to set 620 the control registers, in order to effect the capture 630 of frame n. Similarly, settings 611 are used to set 621 the control registers for the capture 631 of frame n+1. In this example, the capture settings are determined on a frame-by-frame basis. Each setting is applied to only a single frame within the video sequence and the settings can be changed for the next frame.

Figure 6B:
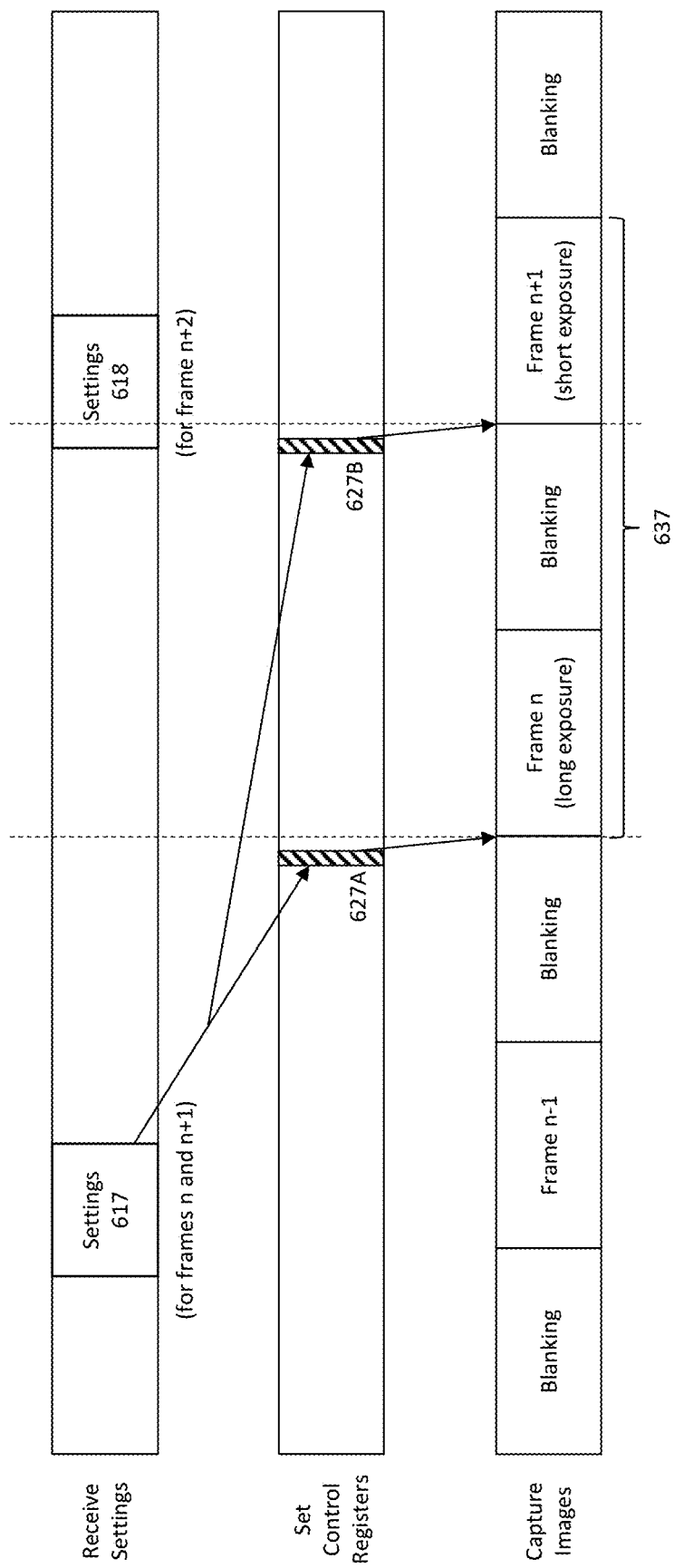

FIG. 6B shows an example using multi-frame control. In this example, the sensor data to be captured includes two frames acquired at different exposures, for example as might be used when acquiring high dynamic range samples. The setting 617 specifies this. Accordingly, the control registers are set 627A for longer exposure for frame n and set 627B for shorter exposure for frame n+1. The settings 617 apply to the image capture 637 of two frames. Other predefined numbers of frames can also be used.

Figure 7A:
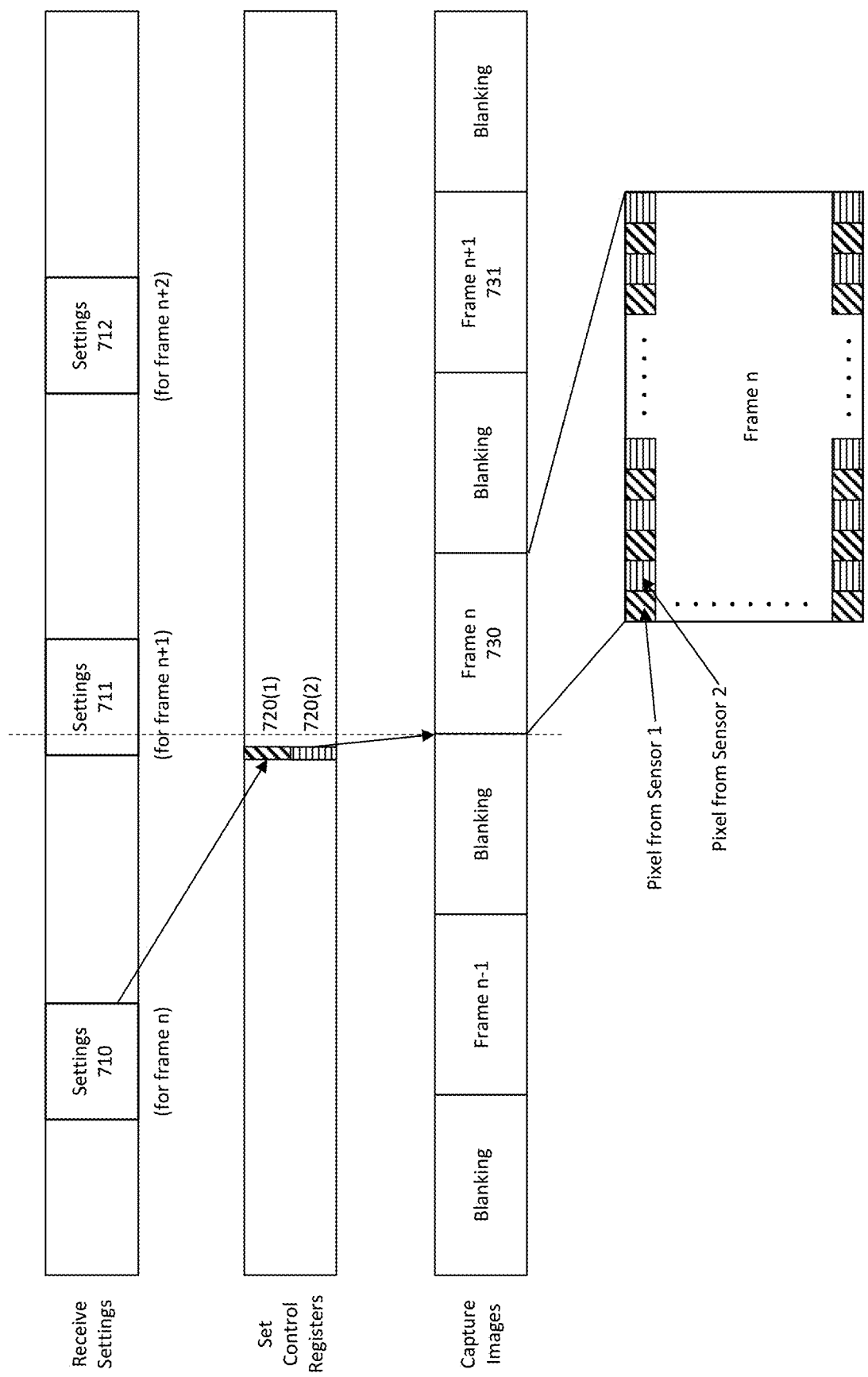
FIGS. 7A-7B are example timelines illustrating interleaving of the capture of multiple video sequences.
Figure 7B:
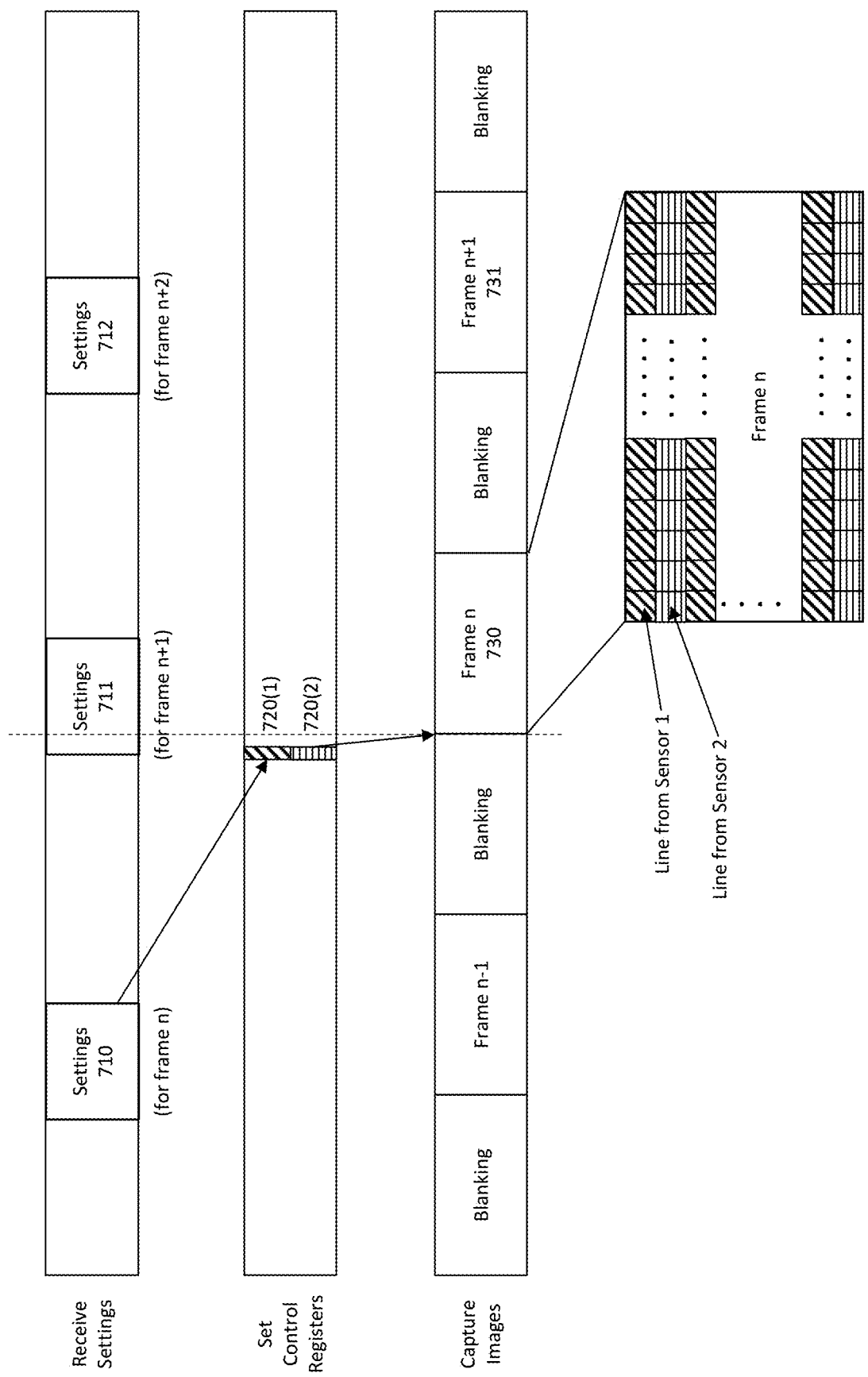

FIGS. 7A-7B illustrate interleaving of sensor data from multiple sensors. In this example, the sensor assembly 560 includes two image capture sensors, each of which captures a video sequence. FIG. 7A shows the two video sequences interleaved by pixels. This interleaving may occur on transmission of frames to the ISP or application processor, for example. The settings 710 include settings for both camera 1 and camera 2 and are used to set 720(1) and 720(2) the corresponding control registers for each camera. Diagonal striping is used to indicate camera 1, and horizontal striping is used to indicate camera 2. Camera 1 captures frame n using setting 1, and camera 2 captures frame n using setting 2. The two frames are interleaved on a pixel basis. That is, every other pixel is from camera 1 and the other pixels are from camera 2.

FIG. 7B shows a similar situation, except that the two images are interleaved on a line basis. Every other line is from camera 1 and the other lines are from camera 2. The two video sequences could also be interleaved on a frame basis. In FIG. 6A, every other frame could be from camera 1 and the other frames from camera 2. The interleaving also does not have to be one to one. In addition, in cases where the two images are not the same size, the smaller image can be zero padded to be the same size as the larger image.

As illustrated by the above examples, the settings passed across the ISM interface may be more complex than just the individual sensor parameters such as exposure, gain, aperture setting, ICR (IR cut-filter remove) switch, zoom, pan and tilt, and focus. Other examples of sensor parameters include resolution, frame rate, time at which exposure should be made, stabilization on or off, shifting the sensor, audio, location and motion. This is especially true if the sensor assembly includes multiple sensors or additional processing capability. For example, if the sensor assembly is capable of capturing different types of images or includes multiple image capture sensors, the settings may determine which types of images to capture or which image capture sensors to use, in addition to individual parameters for capturing the images. If available on the sensor assembly, the settings may also determine functions such as image cropping, encryption, error correction, compression, and early stages of image processing. In one approach, the sensor base uses a discovery process to determine the sensors on the sensor assembly and the processing capabilities of the sensor assembly.

Ultimately, the desired settings manifest themselves as parameters for the operation of individual sensors. However, in one approach, the parameters are grouped into ControlClasses and these ControlClasses are transmitted over the ISM interface rather than independently transmitting many different parameter values. For example, ControlClasses may be defined corresponding to CaptureModes. FIG. 4B defined CaptureModes of HDR, Biometric, Kinetic, Multi-focal, Stereo/Array and Crop. These can also be used to define ControlClasses, as shown in FIG. 8. In this example, the HDR ControlClass corresponds to the HDR CaptureMode and includes the following image capture parameters: exposure, gain, ICR switch, IR/visible flash, and aperture size. The Biometric ControlClass includes exposure, gain, aperture size, zoom, pan/tilt and window size. And so on. In one example, these settings are passed across the ISM interface in the following format:
CaptureMode.HDR.Exposure=0x22,
CaptureMode.HDR.Gain=0x3,
CaptureMode.HDR.ICR=Enabled,
CaptureMode.HDR.IRLED=Disable, and so on. Here, the ControlClass HDR includes the data set of parameters CaptureMode.HDR.xxx.

Each ControlClass is a collection of data fields for parameters, with each data field set according to the class. Some parameters may be set to default settings for a particular ControlClass (for example flash or frame rate). Other parameters may be individually set by the ISP (for example exposure time). From the perspective of the sensor, a number of register settings is sent over the ISM. The parameters may also specify the coordination of different types of sensors, for example the coordinated capture of right and left stereo pairs or the coordinated capture of video images and corresponding audio or motion.

If there is an ISP or other processor that is processing the information sent over the interface, a higher level of abstraction may be used (e.g. a class, an object in JSON, etc). This class is then interpreted by the processor into register settings that are used to configure the sensor on the module. The class or object structure may reference default settings for a particular CaptureMode. Alternately, the class or object may reference the default settings for the CaptureMode (like flash on) and augment them with specific settings or a specific field (like the exposure time for example). This could be achieved by having a SceneMode field in the object or class—which references the default settings that should be used for the CaptureMode. Additional fields in the object or class may be used to augment parameters that are not defined in the CaptureMode or override the default setting for the CaptureMode. ControlClasses may also include parameters that specify processing to be applied by the ISP. As with other types of parameters, these may be applied on a frame-by-frame basis in certain embodiments.

Figure 9:
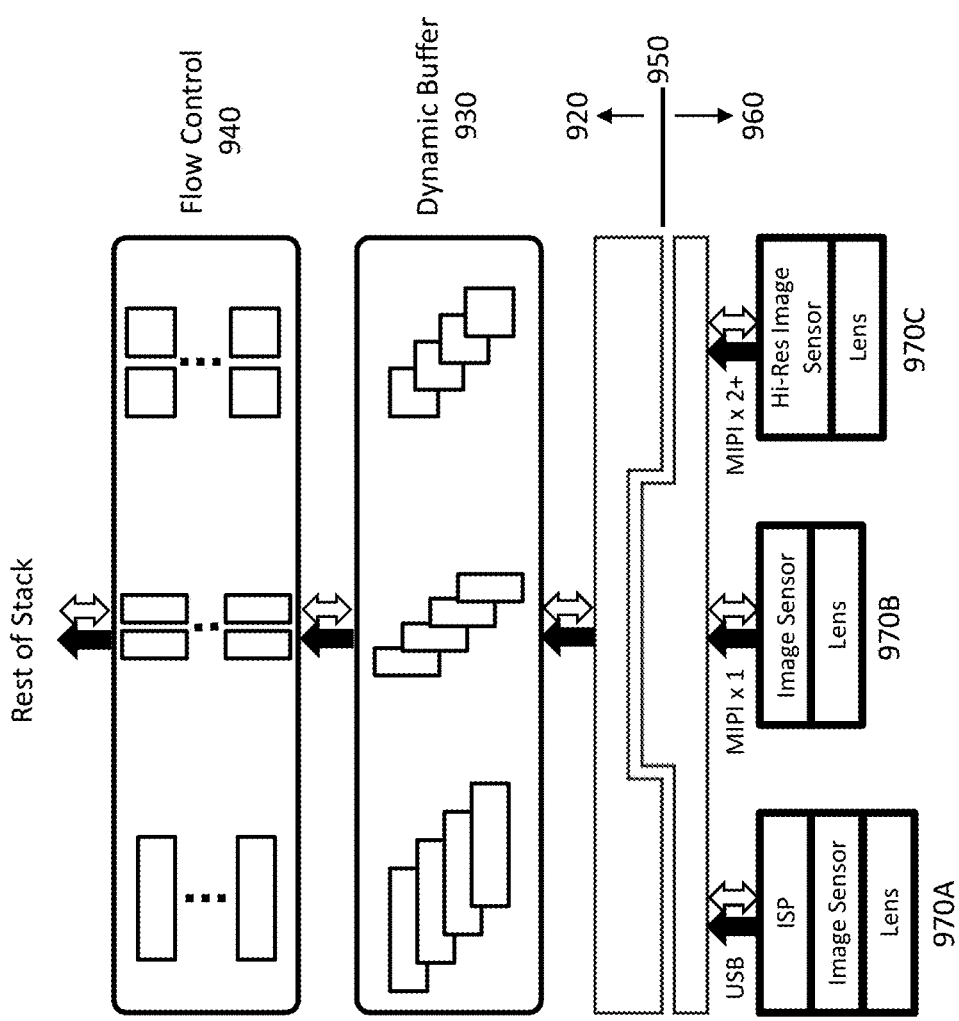
FIG. 9 is a block diagram showing a data path through the interface for an interchangeable sensor mount.

FIG. 9 is a block diagram showing a data path through an ISM 950. In this example, the layers above the interface 950 include the sensor base 920 as well as higher layers of the technology stack. Below the ISM interface 950 is the sensor assembly 960, which in this example includes three different cameras 970A-C. The configuration described in FIG. 1B also includes three cameras, except that here all three cameras 970 are part of a single sensor assembly 960 that is mounted to the sensor base. Thus, all three cameras 970A-C are accessible by the rest of the technology stack and can be operated simultaneously without having to physically interchange camera front-ends. The white arrows indicate the flow of control signals, such as the settings for the image capture. The solid black arrows indicate the flow of captured image data. Sensor data captured by the cameras 970 is buffered in dynamic buffer 930 before flow control 940 is applied. In this example, the dynamic buffer 930 and flow control 940 are implemented in the application processor within the sensor base.

In this example, the ISM interface 950 can be operated in three data transfer modes: synchronous, asynchronous and isochronous. In synchronous mode, frames from different cameras 970 are captured synchronously according to a common clock. The common clock may be regenerated based on data from other sources, such as a clock signal or timestamps from higher in the technology stack. Because images are captured synchronously, the order of the images can be used to provide timing information and timestamps are not always required. For example, cameras that are capturing different images of the same scene (such as a stereo pair or an array of identical cameras) may be operated in synchronous mode, particularly if the cameras are also the same. Another example would be a color camera and a camera that captures depth information, where the intention is to provide a depth map for the color image. In that case, it is advantageous for the two cameras to operate in synchronous mode.

In asynchronous mode, frames from different cameras 970 are captured according to each camera's local clock. This may be used if it is too difficult or not particularly useful to synchronize the different cameras/sensors. For example, if the low-level camera interfaces are very different, it may be difficult to synchronize the cameras. As another example, one of the cameras may be used strictly to set off alarms upon motion detection or upon thermal heat detection. In that case, the primary objective is to detect and sound the alarm. Frame by frame synchronization with other cameras is secondary in importance.

In isochronous mode, frames from different cameras 970 are captured without synchronization to each other but with reference to a common clock. Thus, the frames may be synchronized later, for example by using timestamps referenced to the common clock. An example might be image frames captured by a camera and audio data captured by a microphone. The camera and microphone use different sampling rates and capture their sensor data without direct synchronization. However, samples are timestamped by a common clock and the video and audio streams can later be time-aligned based on these timestamps.

Referring again to FIG. 9, dynamic buffer allocation may be implemented as follows. Allocation tables define the buffer allocations between different cameras 970, with a common clock defining the timing of when each allocation table is valid. In FIG. 9, a high resolution camera 970C captures 1 frame per second but transferred within 100 ms, a MIPI camera 970B captures 10 reduced resolution frames and 90 higher resolution frames per second, and a USB camera 970A captures a continuous 50 frames per second. There are two allocation tables. Allocation table 1 defines a buffer allocation among the three cameras when the high resolution camera is active. Allocation table 1 is valid from t=0 to 100 ms. Allocation table 2 defines an allocation when the high resolution camera is not active, but the other two cameras remain active. Allocation table 2 is valid from t=100 to 1000 ms. Multiple allocation tables can be defined, either with fixed start and finish, or with periodic allocation.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A system comprising:
    a plurality of applications;
    a sensor-side technology stack;
    a first interface between the applications and the sensor-side technology stack, wherein the sensor-side technology stack receives requests from different applications via the first interface, the sensor-side technology stack converting the received requests into a first request for capture of a first video and a second request for capture of a different second video;
    the sensor-side technology stack comprising an image capture device, the image capture device comprising:
        a processor and two image capture sensors that capture frames of video images;
        software programmable registers that determine settings for capture of the frames of video images; and
        a second interface between the image capture device and higher layers of the sensor-side technology stack;
    wherein the image capture device receives via the second interface the first request for capture of the first video and the second request for capture of the different second video; the processor converts the first received request to first settings for the capture of frames of video images and converts the second received request to different second settings for the capture of frames of video images; the processor stores the first and second settings in the registers wherein the image capture sensors concurrently capture frames of video images using the first and second settings; and the image capture device returns the captured frames of video images to the higher layers of the technology stack via the second interface; and
    wherein the requests received by the sensor-side technology stack comprise SceneModes that specify a workflow which yields the first and second settings but that do not directly specify the first and second settings, and the sensor-side technology stack carries out the workflow to determine the first and second settings.

2. The system of claim 1 wherein the SceneModes include at least one of a Security, Robotic, Creative, Appliance/IoT, Health/Lifestyle and Leisure SceneModes; while the first and second settings include at least one of an f-number, aperture setting, shutter speed, exposure, frame rate, gain, and resolution.

3. The system of claim 1 wherein the SceneModes are defined using CaptureModes that correspond to different types of sensor data collection useable in different applications and that do not directly specify the first and second settings.

4. The system of claim 3 wherein the CaptureModes include at least one of a High Dynamic Range, Biometric, Kinetic, Multi-focal, and Stereo/Array CaptureModes.

5. The system of claim 1 wherein at least one of the first and second settings determines the setting for the capture of a predefined number of frames at a time.

6. The system of claim 1 wherein the first and second settings change the setting for the capture of the frames of video images on a frame-by-frame basis.

7. The system of claim 1 wherein the first and second settings comprise one or more parameters; the sensor-side technology stack converts the SceneModes to ControlClasses that specify values of the parameters for the first and second settings; and the processor receives the ControlClasses and converts the ControlClasses to the first and second settings.

8. The system of claim 7 wherein the ControlClasses includes at least one of a High Dynamic Range, Biometric, Kinetic, Multi-focal, Stereo/Array, and Crop ControlClass.

9. The system of claim 7 wherein the ControlClasses are independent of the specific hardware implementation of the image capture sensors.

10. A system comprising:
    a plurality of applications;
    a sensor-side technology stack;
    a first interface between the applications and the sensor-side technology stack, wherein the sensor-side technology stack receives requests from different applications via the first interface, the sensor-side technology stack converting the received requests into a first request for capture of a first video and a second request for capture of a different second video;
    the sensor-side technology stack comprising an image capture device, the image capture device comprising:

a processor and two image capture sensors that capture frames of video images;

software programmable registers that determine settings for capture of the frames of video images; and a second interface between the image capture device and higher layers of the sensor-side technology stack;

wherein the image capture device receives via the second interface the first request for capture of the first video and the second request for capture of the different second video; the processor converts the first received request to first settings for the capture of frames of video images and converts the second received request to different second settings for the capture of frames of video images; the processor stores the first and second settings in the registers wherein the image capture sensors concurrently capture frames of video images using the first and second settings; and the image capture device returns the captured frames of video images to the higher layers of the technology stack via the second interface; and wherein the first and second settings change the setting for the capture of the frames of video images on a frame-by-frame basis.

11. The system of claim 1 wherein the frames of video images captured under the first and second settings have different sizes of images comprising a smaller size image and a larger size image, and the smaller size image is padded to be a same size as the larger size image.

12. An image capture device comprising:

a processor and two image capture sensors that captures frames of video images;

software programmable registers that determine settings of the image capture sensors for capture of the frames of video images; and a first interface between the image capture device and higher layers of a sensor-side technology stack;

wherein the image capture device receives via the first interface a first request for capture of a first video and a second request for capture of a different second video; the processor converts the first received request to first settings of a first of the image capture sensors for the capture of frames of video images and converts the second received request to different second settings of a second of the image capture sensors for the capture of frames of video images; the processor stores the first and second settings in the registers wherein the image capture sensors concurrently captures frames of video images using the first and second settings; and the image capture device returns the captured frames of video images to the higher layers of the technology stack via the first interface; and wherein the first and second settings change the setting for the capture of the frames of video images on a frame-by-frame basis.

13. The image capture device of claim 12 wherein the first and second settings for the capture of frames of video images by the image capture sensors include at least one of the following parameters: pan and tilt, zoom, and focus.

14. The image capture device of claim 12 wherein the first and second settings for the capture of frames of video images by the image capture sensors include at least one of the following parameters: f-number, aperture setting, shutter speed, exposure, frame rate, gain, and resolution.

15. The image capture device of claim 12 wherein at least one of the first and second settings determines the setting for the capture of only a single frame at a time.

16. The image capture device of claim 12 wherein at least one of the first and second settings determines the setting for the capture of a predefined number of frames at a time.

17. The image capture device of claim 12 wherein the frames of video images captured under the first and second settings have different sizes of images comprising a smaller size image and a larger size image, and the smaller size image is padded to be a same size as the larger size image.

18. The image capture device of claim 12 wherein the first and second settings comprise one or more parameters; the processor receives ControlClasses that specify values of the parameters for the first and second settings, and the processor converts the ControlClasses to the first and second settings.

19. The image capture device of claim 18 wherein the ControlClasses includes at least one of a High Dynamic Range, Biometric, Kinetic, Multi-focal, Stereo/Array, and Crop ControlClass.

20. The image capture device of claim 18 wherein the ControlClasses are independent of the specific hardware implementation of the image capture sensors.

* * * * *